United States Patent
Einarsson et al.

(10) Patent No.: US 10,117,093 B2
(45) Date of Patent: Oct. 30, 2018

(54) CONTROL OF USER EQUIPMENT IDENTITY DEPENDENT SERVICE

(71) Applicant: Telefonaktiebolaget LM Ericsson (publ), Stockholm (SE)

(72) Inventors: Per Einarsson, Linköping (SE); Stefan Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 85 days.

(21) Appl. No.: 15/126,462

(22) PCT Filed: Mar. 17, 2014

(86) PCT No.: PCT/SE2014/050318
§ 371 (c)(1),
(2) Date: Sep. 15, 2016

(87) PCT Pub. No.: WO2015/142227
PCT Pub. Date: Sep. 24, 2015

(65) Prior Publication Data
US 2017/0086065 A1    Mar. 23, 2017

(51) Int. Cl.
*H04M 3/42* (2006.01)
*H04W 8/26* (2009.01)
(Continued)

(52) U.S. Cl.
CPC ........... *H04W 8/26* (2013.01); *H04L 63/30* (2013.01); *H04L 63/304* (2013.01); *H04W 8/18* (2013.01);
(Continued)

(58) Field of Classification Search
CPC ......... H04W 8/26; H04W 8/18; H04W 12/02; H04W 36/08; H04W 36/0061;
(Continued)

(56) References Cited

U.S. PATENT DOCUMENTS

2005/0210127 A1* 9/2005 Pohja ............... H04M 3/2281
709/224
2012/0189016 A1* 7/2012 Bakker ............ H04W 76/021
370/401
(Continued)

FOREIGN PATENT DOCUMENTS

EP    2629482 A2    8/2013
WO    2010125982 A1    11/2010
(Continued)

OTHER PUBLICATIONS

3GPP, "3rd Generation Partnership Project; Technical Specification Group Radio Access Network; Evolved Universal Terrestrial Radio Access Network (E-UTRAN); Architecture description (Release 11)", 3GPP TS 36.401 V11.2.0, Sep. 2013, 1-20.
(Continued)

*Primary Examiner* — Kathy Wang-Hurst
*Assistant Examiner* — B. M. M Hannan
(74) *Attorney, Agent, or Firm* — Murphy, Bilak & Homiller, PLLC

(57) ABSTRACT

The present disclosure relates to methods and an identity mediator node for controlling a user equipment, UE, identity, ID, dependent service in a radio base station, RBS of a wireless network. The method comprises receiving (S1) from a Mobility Management Entity, MME, a UE ID report comprising a permanent UE ID, a temporary UE ID, and a serving RBS identity for an RBS serving the UE, wherein the temporary UE ID represents an identifier for the UE in the serving RBS. The identity mediator node stores (S2) a record associating the temporary UE ID, the serving RBS identity, and the permanent UE ID record. When an order to activate a UE ID dependent service for a permanent UE ID is detected (D1) in the identity mediator node, the identity mediator node retrieves (S4) the temporary UE ID and serving RBS identity from the stored record. A request is
(Continued)

sent (S5) to the serving RBS to activate the UE ID dependent service for the UE, wherein the request includes the temporary UE ID.

15 Claims, 7 Drawing Sheets

(51) Int. Cl.
  *H04W 12/02* (2009.01)
  *H04L 29/06* (2006.01)
  *H04W 8/18* (2009.01)
  *H04W 36/08* (2009.01)
  *H04W 36/00* (2009.01)

(52) U.S. Cl.
  CPC ........... *H04W 12/02* (2013.01); *H04W 36/08* (2013.01); *H04W 36/0061* (2013.01)

(58) Field of Classification Search
  CPC ....... H04W 4/02; H04W 36/12; H04W 36/14; H04W 36/18; H04W 36/30; H04W 28/08; H04W 24/00; H04W 24/02; H04W 48/02; H04W 84/045; H04L 63/30; H04L 63/304; H04L 29/08108; H04L 63/306; H04L 12/14; H04L 12/1403; H04L 12/1485; H04L 29/12405; H04L 61/2528; H04L 43/00; H04L 47/50; G06Q 30/02; H04M 2207/18; H04M 15/41
  USPC ..... 455/414.1, 436, 439, 411; 370/230, 235, 370/241, 255, 315, 331, 401
  See application file for complete search history.

(56) References Cited

U.S. PATENT DOCUMENTS

| | | | | |
|---|---|---|---|---|
| 2013/0128873 | A1* | 5/2013 | Eipe ...................... | H04W 76/02 370/338 |
| 2013/0150072 | A1* | 6/2013 | Kapoor ................. | H04W 68/04 455/456.1 |
| 2013/0196630 | A1* | 8/2013 | Ungvari ................ | H04L 63/306 455/411 |
| 2013/0310038 | A1* | 11/2013 | Wang .................... | H04W 60/04 455/436 |
| 2014/0043980 | A1 | 2/2014 | Anthony, Jr. et al. | |
| 2014/0160940 | A1* | 6/2014 | Maehara ............... | H04W 28/08 370/237 |
| 2014/0220936 | A1* | 8/2014 | Turtinen ............... | H04L 67/104 455/411 |
| 2014/0241158 | A1* | 8/2014 | Anthony, Jr. ..... | H04W 28/0231 370/235 |
| 2015/0078173 | A1* | 3/2015 | Javed .................... | H04W 24/08 370/241 |
| 2015/0289302 | A1* | 10/2015 | Xu ........................ | H04W 76/02 370/329 |
| 2016/0127420 | A1* | 5/2016 | Yu ......................... | H04L 63/304 726/30 |

FOREIGN PATENT DOCUMENTS

| | | | | |
|---|---|---|---|---|
| WO | 2011038359 | A2 | 3/2011 | |
| WO | 2011120716 | A1 | 10/2011 | |
| WO | WO-2014051402 | A1 * | 3/2014 | ........... H04W 48/16 |
| WO | WO2014198063 | A1 * | 12/2014 | ........... H04W 12/02 |

OTHER PUBLICATIONS

3GPP, "3rd Generation Partnership Project; Technical Specification Group Services and System Aspects; 3G security; Handover interface for Lawful Interception (LI) (Release 12)", 3GPP TS 33.108 V12.2.0, Sep. 2013, 1-195.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.2.0, Sep. 2013, 1-293.

3GPP, "3GPP TS 29.274 V12.2.0 (Sep. 2013)", 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Sep. 2013, 1-230.

3GPP, "3rd Generation Partnership Project; Technical Specification Group Services and System Aspects; Network architecture (Release 12)", 3GPP TS 23.002 V12.2.0 (Jun. 2013), Jun. 2013, 1-105.

* cited by examiner

CONTROL OF USER EQUIPMENT IDENTITY DEPENDENT SERVICE

TECHNICAL FIELD

The present disclosure relates to a methods and an identity mediator node for control of a user equipment, UE, identity, ID, dependent service for a UE in a radio base station, RBS of a wireless network.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs.

The Evolved Packet Core, EPC, is the core network of the LTE system and is an evolution of the packet-switched architecture used in GPRS/UMTS. The separated sub-domains of previous mobile generations of circuit-switching for voice and packet-switching for data is now realized in the EPC as packet switched architecture only. The main components of the EPC are the Serving Gateway, SGW, the Packet Data Network, PDN, Gateway, PGW, and the Mobility Management Entity, MME.

In an LTE telecommunications network the type of identifiers used for identifying a connected User Equipment, UE, differ between the core network nodes and the LTE radio base stations, eNodeBs, eNBs. The identifier values used for identifying a UE are different in the core nodes and the eNBs. Core nodes typically use long-term values corresponding to the UE's device hardware or SIM card, such as IMSI, MSISDN and IMEI, in the following denoted permanent user equipment, UE, identifiers, IDs. The eNBs are not aware of these identifiers but instead use temporary values corresponding to the temporary connections the eNBs have towards the UE and the core nodes. These temporary UE identifiers may change between eNBs.

Since the LTE eNBs are not aware of the permanent UE IDs used in the core nodes these identifiers may not be used to identify an UE within an eNB. Moreover, a UE identifier used in an eNB is temporary and will change from time to time and between eNBs. Hence, it is not possible to use the permanent UE IDs to trigger functionality in an eNB for a particular UE. However, there are scenarios where there is a need to trigger functionality in an eNB based on a permanent identity.

One such scenario is lawful interception, LI, in cloud networks, whereby operators and Internet service providers are legally obliged to provide traffic data generated from public telecommunications and Internet services for the purpose of detection, investigation and prosecution of crime and criminal offences, including terrorism.

Usually a public official, for instance a judge, is in charge of authorizing investigation on target persons, allowing to activate LI on communications of the target persons or to query data retention databases storing data from user equipment communication. LI implies activating interception on communications directed to/from a user equipment identified as belonging to the target person and/or to retrieve stored communication for an identified user equipment. The service is performed as a UE identity dependent service, based on a permanent identity for UE in the wireless network.

An authorization for investigation on target persons is, however, applicable only in the jurisdiction of the authorizing party. For a scenario of LI in cloud networks, the core nodes of the network may be placed in a different country than the eNBs. Since an authorization to perform LI, only extends to the specific jurisdiction of the authorizing public official, LI information for a specific UE cannot be allowed to be retrieved from or passed to jurisdictions not within the authority of the authorizing public official. Consequently, LI regulations prohibit LI information for a specific UE being passed over country borders, so having LI implemented in the core nodes in one country and intercepting a UE which is served by an eNB in another country is not legal. One possible solution for this is to place LI functionality in the eNBs instead of in the core nodes. However, LI is handled per UE using UE identifiers on a core network level, e.g. IMSI, MSISDN or IMEI. Since these values are not known by the eNBs they can't be used for triggering LI functionality in an eNB for a given UE.

SUMMARY

This disclosure provides improved methods and devices for handling an identity driven service for a user equipment in a radio base station of a wireless network. The disclosure solves the problem of triggering functionality in an eNB based on permanent identity by linking subscriber identity on a core network level to subscriber identity on a radio base station level.

It is an object of the present disclosure to control a user equipment, UE, identity, ID, dependent service for a UE in a radio base station, RBS of a wireless network. This object is achieved by a method performed in an identity mediator node. The method comprises receiving from a Mobility Management Entity, MME, a UE ID report comprising a permanent UE ID, a temporary UE ID, and a serving RBS identity for an RBS serving the UE, wherein the temporary UE ID represents an identifier for the UE in the serving RBS. The identity mediator node stores a record associating the temporary UE ID, the serving RBS identity, and the permanent UE ID record. When an order to activate a UE ID dependent service for a permanent UE ID is detected in the identity mediator node, the identity mediator node retrieves the temporary UE ID and serving RBS identity from the stored record. A request is sent to the serving RBS to activate the UE ID dependent service for the UE, wherein the request includes the temporary UE ID.

The disclosure solves the problem of triggering functionality in an eNB based on permanent identity by linking subscriber identity on a core network level to subscriber identity on a radio base station level whilst still restricting access to a permanent UE identity in the radio base station and preventing dissemination of the UE identity in the wireless interface. This enables activation in an RBS/eNB of RBS/eNB internal operations for a specific UE based on its core network level identity.

According to an aspect of the disclosure, the UE ID report is received when the UE attaches to the RBS.

Receipt of the UE ID report as a consequence of a UE attach, provides for prompt activation of the UE ID dependent service in the RBS by the identity mediator node.

According to an aspect of the disclosure, the permanent UE ID is an IMSI, International Mobile Subscriber Identity, MSISDN, Mobile Subscriber ISDN Number, IMEI, International Mobile Station Equipment Identity, or MEID, Mobile Equipment Identifier.

Activation of the UE identity dependent service is thus based on identifiers already available on a core network level.

According to an aspect of the disclosure, the RBS is an eNB of a Long Term Evolution, LTE, wireless network, and wherein the step of identifying the serving RBS comprises receiving a Global eNB ID for the eNB.

According to an aspect of the disclosure, the temporary UE ID is an MME S1AP UE ID, and wherein the MME S1AP UE ID is created in the MME and communicated to the RBS to provide a common identifier for the UE in the MME and the RBS.

Thus, the disclosure benefits from a message structure already included in standard LTE functionality.

According to an aspect of the disclosure, the UE ID dependent service is lawful interception, LI.

The disclosed method is particularly advantageous when the UE ID dependent service is lawful interception, since there are a number of legal restrictions when performing the UE dependent service, especially for LI involving entities situated in different jurisdictions.

According to an aspect of the disclosure, the step of storing a record associating the temporary UE ID, the RBS identity, and the permanent UE ID, further comprises storing a handover status for the permanent UE ID.

When a UE has attached to a serving RBS in the wireless network, the disclosure further comprises embodiments solving the problem controlling the UE ID dependent service at handover or detach from the serving RBS.

In accordance with an aspect of the disclosure, having performed one or more of the previously disclosed steps of activating the UE ID dependent service following attach to the wireless network, the method further comprises receiving, from the serving RBS/eNB, a message comprising a target RBS/eNB identity, wherein the target RBS/eNB is selected for handover of the UE from the serving RBS/eNB. The target RBS/eNB identity is stored in the stored record in the identity mediator node. The identity mediator node designates the target RBS/eNB as the serving RBS/eNB when receiving a handover completion message from the target RBS/eNB.

The disclosed method enables handover from one RBS/eNB to another RBS/eNB handled by the same MME while up-holding the UE ID dependent service in a serving RBS/eNB through the handover procedure.

In accordance with an aspect of the disclosure, the method further comprises receiving, from the target RBS/eNB, a target temporary UE ID for the UE, the target temporary UE ID representing an identifier for the UE in the target RBS/eNB, and storing the target temporary UE ID in the stored record.

In accordance with an aspect of the disclosure, the identity mediator node activates the UE ID dependent service in the target RBS.

In accordance with an aspect of the disclosure, having performed one or more of the previously disclosed steps of activating the UE ID dependent service following attach to the wireless network, the method further comprises receiving, from an MME, a message comprising a target RBS/eNB identity, wherein the target RBS/eNB is selected for handover of the UE, a target temporary UE ID for the UE, the target temporary UE ID representing an identifier for the UE in the target RBS; and a permanent UE ID for the UE. The identity mediator node stores information on the target RBS/eNB identity and the target temporary UE ID in the stored record. The identity mediator node designates the target RBS/eNB as the serving RBS/eNB in the stored record when receiving a handover completion message from the target RBS/eNB.

The disclosed method enables handover from one RBS/eNB to another RBS/eNB handled by a different MME while up-holding the UE ID dependent service in a serving RBS/eNB through the handover procedure.

According to an aspect of the disclosure, the identity mediator node further activates the UE ID dependent service in the target RBS.

According to an aspect of the disclosure, having performed one or more of the previously disclosed steps, the method further comprises deactivating of the UE ID dependent service performed in a serving RBS. In addition to any of the previously disclosed method steps, the method further comprises receiving an order to deactivate a UE ID dependent service for a permanent UE ID. The identity mediator node retrieves the temporary UE ID and serving RBS identity from the stored record and sends a request to the serving RBS to deactivate the UE ID dependent service for the UE, wherein the request includes the temporary UE ID.

According to an aspect of the disclosure, having performed one or more of the previously disclosed steps, the method further comprises detaching the UE from the wireless network. In addition to any of the previously disclosed method steps, the method further comprises receiving, in a UE ID report from the MME, a permanent UE identity and an order to detach from the wireless network. The identity mediator node retrieves the temporary UE ID and serving RBS identity from the stored record and sends a request to the serving RBS to deactivate the UE ID dependent service for the UE, wherein the request includes the temporary UE ID. The step of clearing the stored record associated to the permanent UE ID concludes a detach of the UE.

The disclosure also relates to an identity mediator node for controlling a user equipment, UE, identity, ID, dependent service for a UE in a radio base station, RBS, of a wireless network. The identity mediator node comprises a processor, a communication interface and a memory, said memory containing instructions executable by said processor. The identity mediator node is operative to receive, from a Mobility Management Entity, MME, a UE ID report comprising a permanent UE ID, a temporary UE ID, and a serving RBS identity for an RBS serving the UE, wherein the temporary UE ID represents an identifier for the UE in the serving RBS; to store a record associating the temporary UE ID, the serving RBS identity, and the permanent UE ID, and when an order to activate a UE ID dependent service for a permanent UE ID is detected in the identity mediator node, to retrieve the temporary UE ID and serving RBS identity from the stored record; and send a request to the serving RBS to activate the UE ID dependent service for the UE, wherein the request includes the temporary UE ID.

The disclosure also relates to a computer-readable storage medium, having stored thereon a computer program which when run in an identity mediator node causes the node to perform the method as disclosed.

The identity mediator node and the computer-readable storage medium each display advantages corresponding to the advantages already described in relation to the disclosure of the method in an identity mediator node.

The disclosure also relates to a method, performed in a Mobility Management Entity, MME, of enabling a user equipment, UE, identity, ID, dependent service, the UE ID dependent service being performed in a radio base station, RBS, serving a user equipment, UE, controlled by the MME. The method comprises creating a UE ID report comprising a permanent UE ID, a temporary UE ID, and a serving RBS identity for an RBS serving the UE, wherein the temporary UE ID represents an identifier for the UE in the serving RBS; and sending the UE ID report to an identity mediator node.

The method performed in an MME discloses advantages corresponding to the advantages already described in relation to the disclosure of the method in an identity mediator node.

The disclosure also relates to a method performed in an RBS, radio base station, of controlling a user equipment, UE, identity, ID dependent service for a UE in the RBS. The method comprises receiving, from an identity mediator node, a request to activate a UE ID dependent service for a UE in the RBS, wherein the request includes a temporary UE ID identifying the UE in the RBS; and activating the UE ID dependent service for the UE based on the received message.

The method performed in an RBS discloses advantages corresponding to the advantages already described in relation to the disclosure of the method in an identity mediator node.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Embodiments of the present disclosure relate, in general, to the field of handling a user equipment identity dependent service, e.g. lawful interception, LI, in an EPC, Evolved Packet Core, wireless network. However, it should be appreciated that the principle in general is applicable in any wireless network where performance of a user equipment identity dependent service is requested and the UE identity dependent service is to be performed in a network node lacking information on the UE identity.

Figure 1:
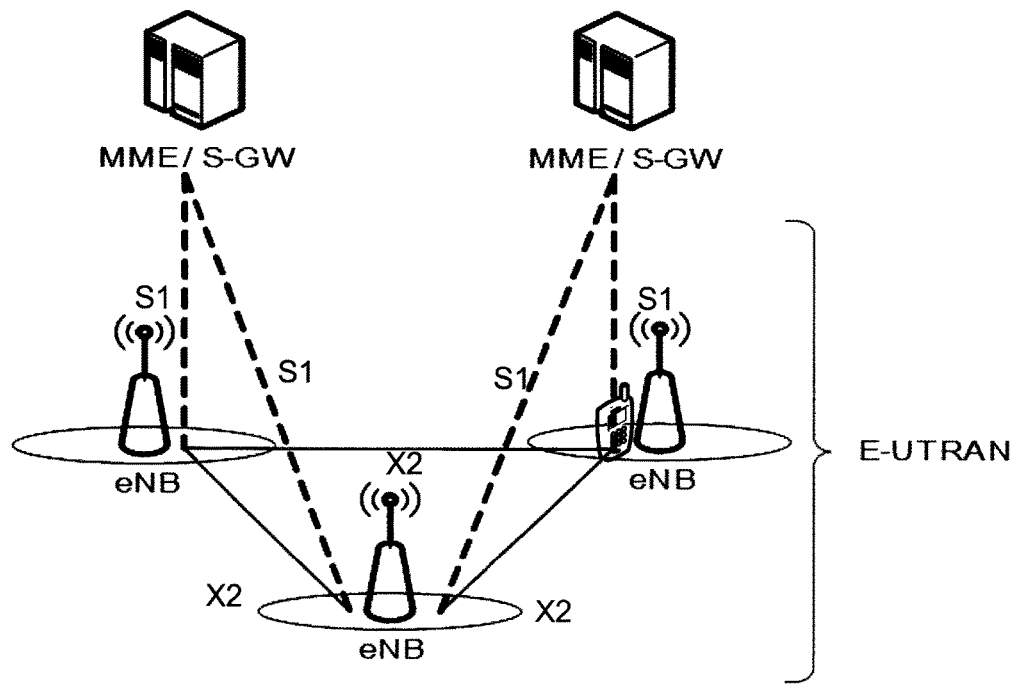
FIG. 1 shows the basic LTE architecture.

FIG. 1 schematically illustrates a basic LTE, Long Term Evolution, network architecture, including radio base stations, RBS, arranged for communicating with wireless devices over a wireless communication interface. The plurality of RBSs, here shown as eNBs, is connected to MME/S-GW entities via S1 interfaces. The eNBs are connected to each other via X2 interfaces.

In the LTE network, the eNBs use temporary identifiers for identifying specific user equipment, UE, when attached to the eNB. Long term or permanent UE identifiers are used on a core network level, i.e. in core nodes. Examples of core nodes are the MME, HSS, S-GW and PDN-GW. Subscriber identifiers used in the core nodes include IMSI, International Mobile Subscriber Identity, MSISDN, Mobile Subscriber ISDN Number, IMEI, International Mobile Station Equipment Identity and MEID, Mobile Equipment Identifier. These are possible identities to use when triggering a UE ID dependent service, e.g. Lawful Interception, LI, for a given subscriber according to current 3GPP LI standards. The permanent UE identifiers relate to the identity of the user equipment itself, e.g. to the UEs device hardware, or to an identity of a subscriber to a service in the wireless network, e.g. an identity related to the subscriber identity module, SIM, card. The eNBs are not aware of the permanent UE identifiers. Table 1 below exemplifies UE identifiers used for identification in core nodes and/or the radio base stations of an LTE wireless network.

TABLE 1

| UE Identifier | Description | Known in RBS/eNB | Known in core nodes |
| --- | --- | --- | --- |
| International Mobile Equipment Identity (IMEI) | Unique permanent number identifying a psychical mobile device. Usually printed inside the battery compartment. | No | Yes |
| International Mobile Subscriber Identity (IMSI) | Identifies the SIM card in a mobile. A SIM is uniquely associated with an IMSI. | No | Yes |
| Mobile Subscriber ISDN Number (MSISDN) | The telephone number to a SIM card in a mobile. The MSISDN of a SIM may change in time (for example via number portability). | No | Yes |
| eNB S1AP UE ID | Temporary value that uniquely identifies a UE within an eNB. | Yes | Yes |
| MME S1AP UE ID | Temporary value that uniquely identifies a UE within an MME. | Yes | Yes |

Since the LTE eNBs are not aware of the UE identifiers used in the core nodes these identifiers cannot be used to identify a UE within an eNB. Moreover, the UE identifier used in an eNB is temporary and will change from time to time and between eNBs.

Figure 2:
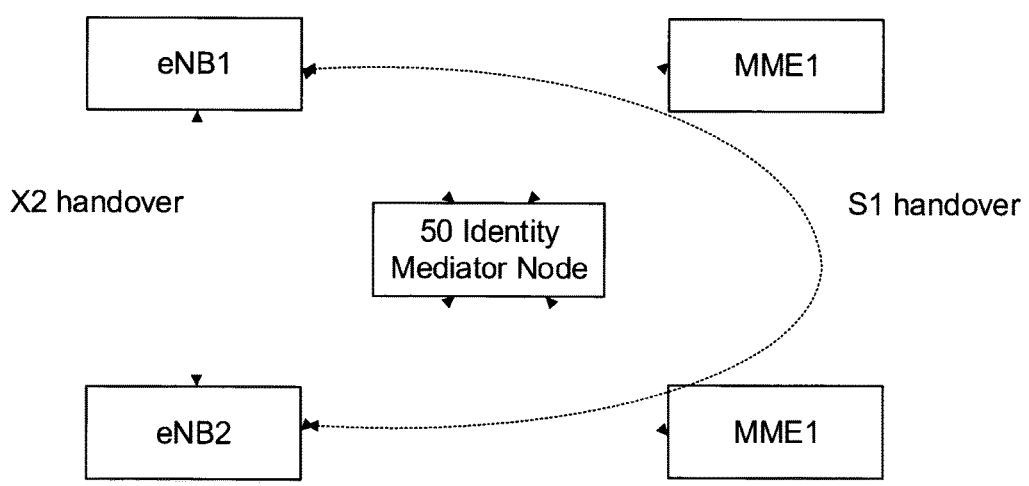
FIG. 2 discloses a schematic architecture including an identity mediator node for controlling a user equipment identity dependent service.

FIG. 2 discloses a schematic architecture including an identity mediator node for controlling a user equipment identity dependent service according to the proposed technique. It should be appreciated that the identity mediator node could be a dedicated node for the purpose described below, but may also be a service or function included in an already existing node in the network.

The identity mediator node is introduced in an interface between the RBSs/eNBs and the MME serving these RBSs/eNBs. The identity mediator node is connected to RBSs/eNBs that serves the UEs in the area in question and the MMEs serving these RBSs/eNBs over a communications interface. The protocol or protocols to use for this communication are not defined here, but could be proprietary.

UE Attachment

Figure 3:
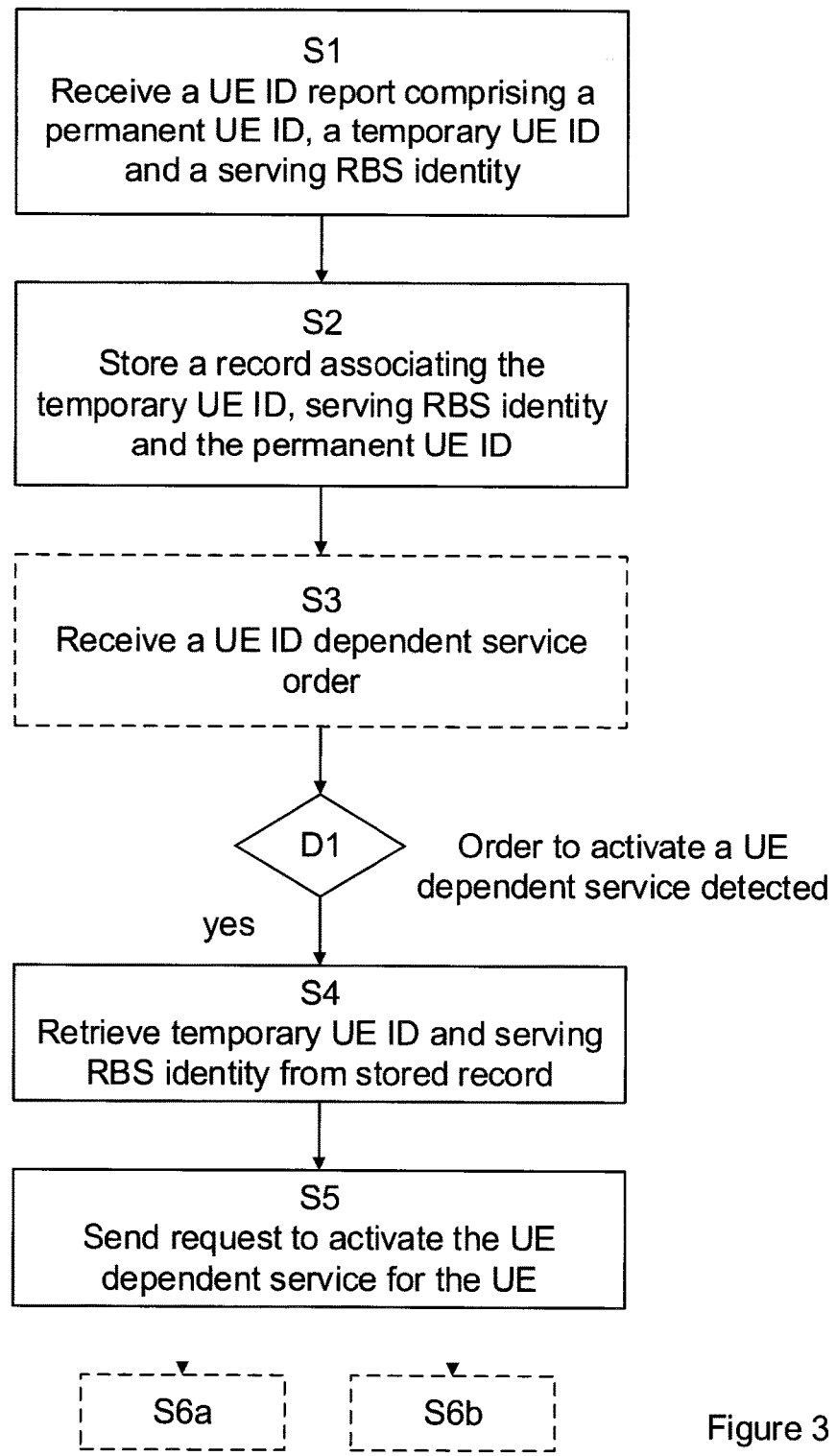
FIG. 3 is a flowchart schematically illustrating embodiments of method steps performed in an identity mediator node for controlling a user equipment identity dependent service in a radio base station during UE attachment.

FIG. 3 is a flowchart schematically illustrating embodiments of method steps performed in an identity mediator node for controlling a user equipment identity dependent service in a radio base station. The basic steps illustrated in the flowchart of FIG. 3 are performed as part of UE attachment to the wireless network.

In a first step S1 performed in the identity mediator node, the node receives, from a Mobility Management Entity, MME, a UE ID report comprising a permanent UE ID, a temporary UE ID, and a serving RBS identity for an RBS serving the UE, wherein the temporary UE ID represents the identity of the permanent UE ID in the identified RBS, i.e. an identifier for the UE in the serving RBS.

According to an aspect of the disclosure, the temporary UE ID is an MME S1AP UE ID created during UE attachment to the MME. The MME S1AP UE ID is used to identify the UE within the MME and is included in all further messages towards the RBS/eNB. The MMEs are made to inform the identity mediator node of any MME S1AP UE ID changes. Whenever an MME S1AP UE ID is created as part of an attachment the MME sends a UE ID Report message to the identity mediator node with the following content:

IMSI
Cause: Attachment
MME S1AP UE ID, as created by the MME during the attach
Global eNB ID of the eNB being attached to In step S2, the identity mediator node stores a record associating the temporary UE ID, the serving RBS identity, and the permanent UE ID. According to an aspect of the disclosure, the identity mediator node includes a memory holding a database with records of UE ID mapping information associating the temporary UE ID, the serving RBS identity and the permanent UE ID. The database is updated upon any type of changes in the associations. Record 1 below illustrates an example record of the UE ID mapping information. In the following, bold fonts will be used to distinguish new content in a stored record.

| | | Record 1 | | | |
|---|---|---|---|---|---|
| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
| <IMSI> | <eNB ID> | <MME S1AP UE ID> | | | N |

In a determination step D1, an order S3 to activate a UE ID dependent service for a permanent UE ID is detected in the identity mediator node, whereupon, in step S4, the identity mediator node retrieves the temporary UE ID and serving RBS identity from the stored record.

According to an aspect of the disclosure, use of the above described database and stored records by the identity mediator node is directly associated to a determined need for the mapping information. Thus, when interception is ordered by an operator towards the identity mediator node, based on the IMSI of the subscriber to be intercepted, the identity mediator node consults the database and finds the MME S1AP UE ID and Global eNB ID for the IMSI in question, if the UE has attached.

In step S5, the identity mediator node sends a request to the serving RBS to activate the UE ID dependent service for the UE, wherein the request includes the temporary UE ID.

Thus following receipt of an order for the UE ID dependent service from an operator, e.g. by means of a message from an O&M system, the identity mediator node orders an RBS/eNB to initiate a UE ID dependent service. The RBS/eNB is identified in the record by its global eNB ID. The order to the RBS/eNB to start the UE ID dependent service, e.g. lawful interception, on the UE includes the MME S1AP UE ID retrieved from the stored record associating the permanent UE ID, here illustrated as the IMSI, with the MME S1AP UE ID. The RBS/eNB then adds the ID to a list of UEs selected for the UE ID dependent service, e.g. LI, and initiates the service.

The identity mediator node also monitors the incoming updates from the MMEs in order to detect if a subscriber/UE for which interception has already been ordered attaches to the network. In such cases, the identity mediator node orders the concerned RBS/eNB to start interception immediately.

Figure 6A:
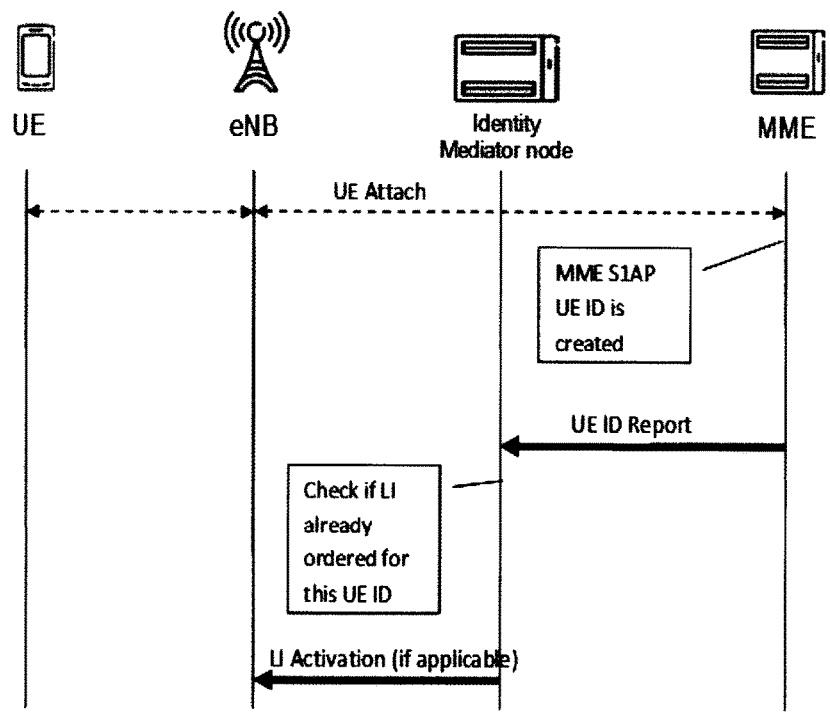
FIG. 6
  a. is a signaling diagram disclosing UE attachment;
  b. is a signaling diagram disclosing X2 handover;
  c. is a signaling diagram disclosing S1 handover;
  d. is a signaling diagram disclosing UE detachment.

FIG. 6a illustrates signaling between the UE, network nodes and the identity mediator node to control lawful interception, LI, upon UE attachment to the wireless network. The MME S1 AP UE ID is an identifier from the LTE standard, see MME UE S1AP ID description in 3GPP TS 36.401. (Section 6.2.1 in rev V11.2.0), which is assigned by the MME to every UE connection and which is known by both the MME and the RBS/eNB serving a connected UE. The MME S1AP UE ID is included in all further messages to the RBS/eNB.

The MME sends a UE ID report message to a receiving identity mediator node, the UE ID report message including the information illustrated in Record 1 above. The identity mediator node checks whether LI has already been ordered for the UE in question and, if so sends an LI Activation message to a receiving RBS/eNB to order activation of the LI service in the RBS/eNB.

As already disclosed above, initiating control of a UE ID dependent service at UE attachment also involves a number of steps performed in an MME. Summarizing these steps from an MME perspective, the following steps are performed during UE attachment:

creating a UE ID report comprising a permanent UE ID, a temporary UE ID, and a serving RBS identity for an RBS serving the UE, wherein the temporary UE ID represents an identifier for the UE in the serving RBS; and sending the UE ID report to an identity mediator node.

As already disclosed above, initiating control of a UE ID dependent service at UE attachment also involves a number of steps performed in an RBS/eNB. Summarizing these steps from an RBS/eNB perspective, the following steps are performed during UE attachment:

receiving, from an identity mediator node, a request to activate a UE ID dependent service for a UE in the RBS/eNB, wherein the request includes a temporary UE ID identifying the UE in the RBS/eNB; and activating the UE ID dependent service for the UE based on the received message.

Following the UE attachment to the network, control of the UE ID dependent service is maintained as the UE moves through the network.

Control of the UE ID dependent service also implies deactivation of the service in a serving RBS/eNB. According to an aspect of the disclosure, the record stored in the identity mediator node is cleared following deactivation so that information on previously performed services is removed. According to another aspect of the disclosure, the identity mediator node continues to keep track of the UE and its temporary ID as long as the UE is attached to the network regardless of whether LI is active or not, since an order to activate LI for any given UE might be received at any time. Deactivation of the UE ID dependent service in the identity mediator node comprises receiving an order to deactivate a UE ID dependent service for a permanent UE ID, e.g. from an O&M system or by input from any other type of operator controlled interface to the identity mediator node. The identity mediator node retrieves the temporary UE ID and serving RBS identity from the stored record and sends a request to the serving RBS to deactivate the UE ID dependent service for the UE, wherein the request includes the temporary UE ID.

X2 Handover

Figure 4A:
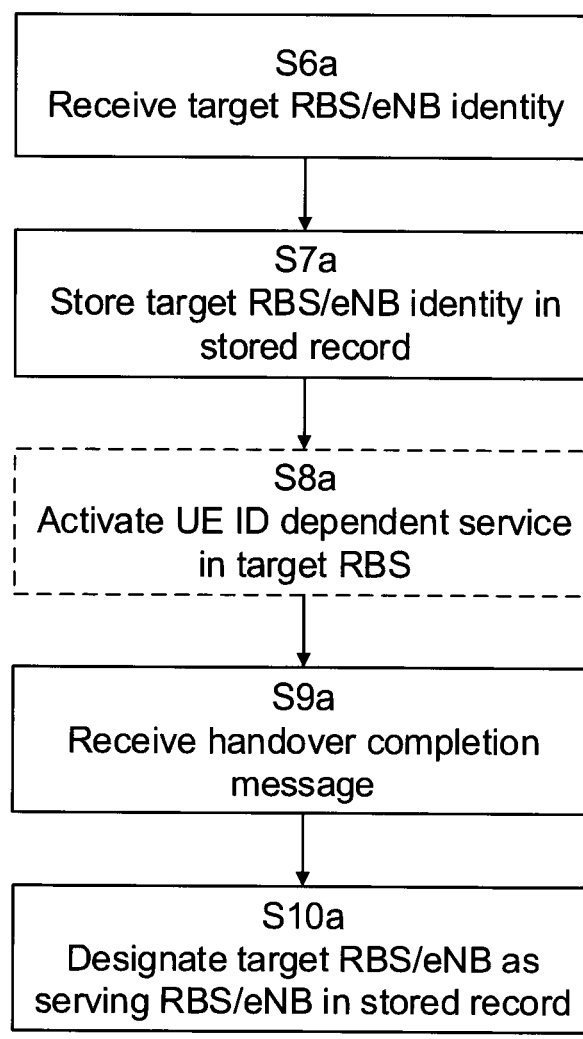
FIG. 4
  a. is a flowchart schematically illustrating embodiments of method steps performed in an identity mediator node for controlling a user equipment identity dependent service in a radio base station during X2 handover;
  b. is a flowchart schematically illustrating embodiments of method steps performed in an identity mediator node for controlling a user equipment identity dependent service in a radio base station during S1 handover.

FIG. 4a is a flowchart schematically illustrating embodiments of method steps performed in an identity mediator node for performing handover from one RBS/eNB to another RBS/eNB handled by the same MME. The handover information is sent over the X2 interface between a serving RBS/eNB controlling a UE ID dependent service in a radio base station and a target RBS/eNB selected for handover and thus taking over the control of the UE ID dependent service. The basic steps illustrated in the flowchart of FIG. 3 have been performed as part of UE attachment prior to the steps illustrated in FIG. 4a.

In step 6a, the identity mediator node receives from the serving RBS/eNB, a message comprising a target RBS/eNB identity, wherein the target RBS/eNB selected is selected for handover of the UE from the serving RBS/eNB. In the following disclosure of the X2 handover, the term source RBS/eNB will be used to denote a serving or current RBS/eNB that the handover is performed from.

As a result of the previously disclosed attachment procedure, the identity mediator node holds a stored record including a permanent UE ID, a temporary UE ID, and a source RBS identity for an RBS serving the UE, wherein the temporary UE ID represents an identifier for the UE in the source RBS, illustrated in Record 1.

According to an aspect of the disclosure, when the handover preparation phase is completed the UE ID dependent service, e.g. an LI function, in the source RBS/eNB informs the identity mediator node of an upcoming handover by sending a handover initiation message. The identity mediator node thereby receives information that the UE with the stored MME S1AP UE ID is about to handover to the target RBS/eNB, identified with target eNB Global ID.

In step S7a, the identity mediator node stores target RBS/eNB identity in the stored record. The identity mediator node updates its record relating to the UE with the target RBS/eNB Global ID and a note that a handover to the target RBS/eNB is in progress. The updated record is illustrated in Record 2 below.

Record 2

| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
|---|---|---|---|---|---|
| <IMSI> | <source eNB ID> | <source S1AP ID> | <target eNB ID> | | ~~N~~ Y |

In step S8a the identity mediator node activates the UE ID dependent service in the target RBS given that the service was active in the source RBS/eNB. If the identity mediator node has noted that interception is ongoing for the UE in question then the identity mediator node informs the target RBS/eNB that interception for the UE with the stored MME S1AP UE ID should be activated. The target RBS/eNB adds the ID to its list of intercepted UEs.

When receiving a handover completion message in a step 9a, the identity mediator node proceeds, in step S10a, to designate the target RBS/eNB as the serving RBS/eNB in the stored record. The target RBS/eNB sends a handover completion message to inform identity mediator node that the handover is completed. The message includes the current MME S1AP UE ID, which may have been changed during the handover. The message is sent regardless of whether interception is active or not, as the information is needed in the identity mediator node if interception is ordered later. The identity mediator node notes that handover is no longer in progress and updates the current RBS/eNB and MME S1AP ID information of the UE as disclosed in Record 3 below.

Record 3

| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
|---|---|---|---|---|---|
| <IMSI> | <target eNB ID> | <target S1AP ID> | ~~<target eNB ID>~~ | | ~~Y~~ N |

Also, when the handover is finished, the source RBS/eNB deactivates interception for the UE in question, if it was active, by removing the MME S1AP UE ID from its list of intercepted UEs.

If handover fails then the source RBS/eNB informs the identity mediator node which removes the "handover in progress" information from the UE→eNB list. The source RBS/eNB continues to be the one considered in use. Any changes in connected RBS/eNB or MME S1AP UE ID during a re-establishment triggered by a failed handover will be reported to the identity mediator node via the MMEs as previously disclosed for UE attachment. The target RBS/eNB removes the MME S1AP UE ID from its list of intercepted UEs. The global target RBS/eNB ID is removed from the record resulting in a Record 4 as disclosed below, with a content corresponding to Record 1 following UE attachment.

| Record 4 | | | | | |
|---|---|---|---|---|---|
| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
| <IMSI> | <source eNB ID> | <source S1AP ID> | <del>target eNB ID></del> | | <del>Y</del> N |

Figure 6B:
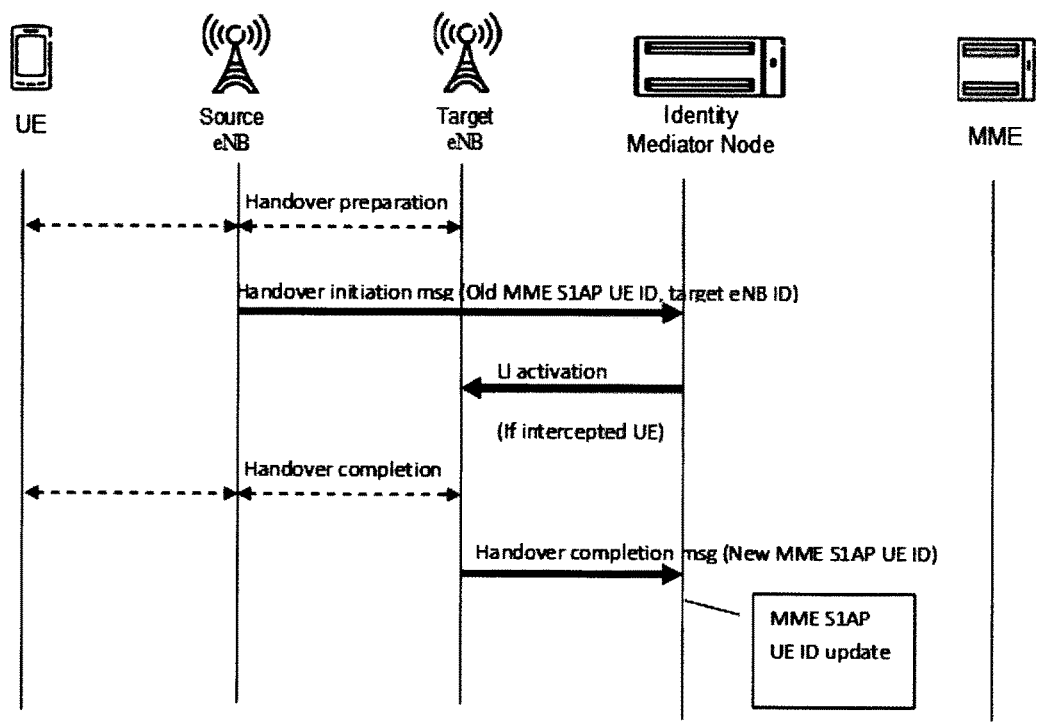

FIG. 6b illustrates signaling between the UE, network nodes and the identity mediator node to control lawful interception, LI, upon X2 handover in the wireless network. Following handover preparation involving the UE, a source RBS/eNB and a target RBS/eNB, the source RBS/eNB sends a handover initiation message to the identity mediator node including the MME S1 AP UEE ID and the global target RBS/eNB ID.

If a UE ID dependent service, here illustrated as LI, is on-going in the source RBS/eNB, an LI activation message is sent to the target RBS/eNB to activate the LI service in the target RBS/eNB.

Signaling related to control of the UE ID dependent service is concluded by a handover completion message sent to the identity mediator node from the target RBS/eNB.

Steps performed in the MME and RBS/eNB have not been separately disclosed in the above discussion on X2 handover, but are of course also a part of the disclosed solution.

S1 Handover

Figure 4B:
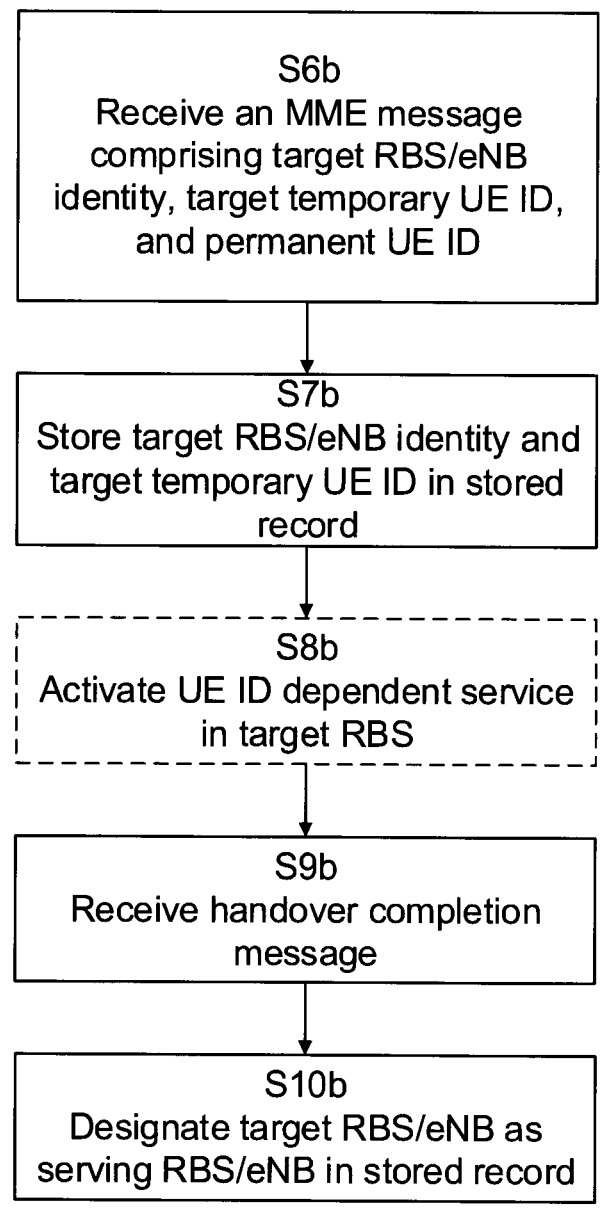

FIG. 4b is a flowchart schematically illustrating embodiments of method steps performed in an identity mediator node for performing handover from one RBS/eNB to another RBS/eNB handled by a different MME. The handover information is not sent directly from RBS/eNB to RBS/eNB but on the S1 interface via the MMEs. The basic steps illustrated in the flowchart of FIG. 3 have been performed as part of UE attachment prior to the steps illustrated in FIG. 4b.

As a result of the previously disclosed attachment procedure, the identity mediator node holds a stored record including a permanent UE ID, a temporary UE ID, and a serving RBS identity for an RBS serving the UE, wherein the temporary UE ID represents an identifier for the UE in the serving RBS, illustrated in Record 1.

In step 6b, the identity mediator node receives from an MME, a message comprising a target RBS/eNB identity, wherein the target RBS/eNB is selected for handover of the UE, a target temporary UE ID for the UE, the target temporary UE ID representing an identifier for the UE in the target RBS; and a permanent UE ID for the UE. In the following disclosure of the S1 handover, the term source RBS/eNB will be used to denote a serving or current RBS/eNB that the handover is performed from.

When the handover has been triggered in the target MME, the target MME creates a new MME S1AP UE ID for the UE and includes it in the Handover Request to the target RBS/eNB. This step is part of standard LTE functionality. As described in the attachment case above, the MMEs are made to inform the identity mediator node of MME S1AP UE ID changes. When the target MME receives a Handover Request Acknowledge from the target RBS/eNB, i.e. when the preparation phase is completed, the target MME sends a handover initiation message to the identity mediator node with the following content:

IMSI
Cause: S1 handover
new MME S1 AP UE ID (as created in target MME)
Global RBS/eNB ID of target RBS/eNB In step S7b, the identity mediator node stores information on the target RBS/eNB identity and the target temporary UE ID in the stored record. The identity mediator node updates its record relating to the UE with the target RBS/eNB Global ID and a note that a handover to the target RBS/eNB is in progress. The updated record is illustrated in Record 5 below.

| Record 5 | | | | | |
|---|---|---|---|---|---|
| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
| <IMSI> | <source eNB ID> | <source S1AP ID> | <target eNB ID> | <target S1AP ID> | <del>N</del> Y |

In step S8b the identity mediator node activates the UE ID dependent service in the target RBS given that the service was active in the source RBS/eNB. If the identity mediator node has noted that interception is ongoing for the UE in question then the identity mediator node informs the target RBS/eNB that interception for the UE with the stored MME S1AP UE ID should be activated. The target RBS/eNB adds the ID to its list of intercepted UEs.

When receiving a handover completion message from the target RBS/eNB in a step 9b, the identity mediator node proceeds, in step S10b, to designate the target RBS/eNB as a serving or current RBS/eNB in the stored record. The target RBS/eNB informs the identity mediator node that the handover has completed. This is done regardless of whether interception is active or not, as the information is needed in the identity mediator node if interception is ordered later. The identity mediator node notes that handover is no longer in progress and updates the serving or current RBS/eNB and MME S1AP ID information of the UE as disclosed in Record 6 below.

| Record 6 | | | | | |
|---|---|---|---|---|---|
| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
| <IMSI> | <target eNB ID> | <target S1AP ID> | <del>target eNB ID></del> | <del>target S1AP ID></del> | <del>Y</del> N |

Also, when the handover is finished the source RBS/eNB, deactivates interception for the UE in question, if it was active, by removing the MME S1AP UE ID from its list of intercepted UEs.

If handover fails then the source RBS/eNB informs the identity mediator node which removes the "handover in progress" information from the UE→eNB list. The source RBS/eNB continues to be the one considered in use. Any changes in connected RBS/eNB or MME S1AP UE ID during a re-establishment triggered by a failed handover will be reported to the identity mediator node via the MMEs as previously disclosed for UE attachment. The target RBS/eNB removes the MME S1AP UE ID from its list of intercepted UEs. The global target RBS/eNB ID is removed from the record resulting in a Record 7 as disclosed below, with a content corresponding to Record 1 following UE attachment.

Record 7

| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
| --- | --- | --- | --- | --- | --- |
| <IMSI> | <source eNB ID> | <source S1AP ID> | ~~<target eNB ID>~~ | ~~<target S1AP ID>~~ | ~~Y~~ N |

Figure 6C:
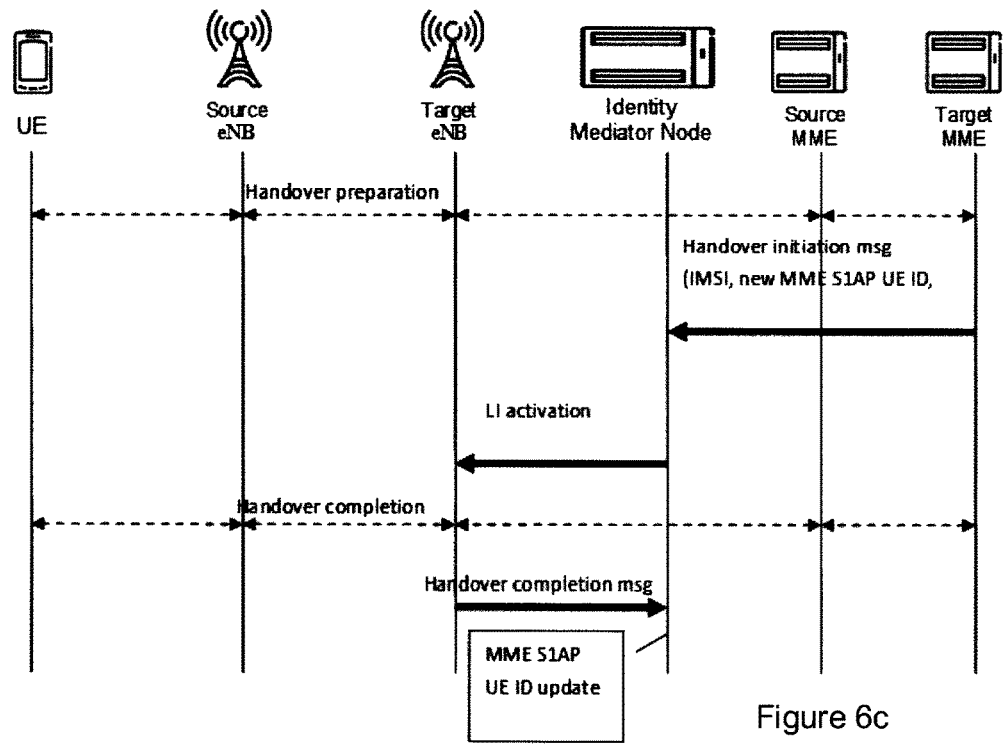

FIG. 6c illustrates signaling between the UE, network nodes and the identity mediator node to control lawful interception, LI, upon S1 handover in the wireless network. Following handover preparation involving the UE, a source RBS/eNB, a source MME, a target RBS/eNB, and a target MME; the target RBS/eNB sends a handover initiation message to the identity mediator node including the permanent UE ID, the temporary UE ID and information on a target RBS/eNB identity, in the disclosed example represented by the IMSI, a new MME S1 AP UE ID and the global target RBS/eNB ID.

If a UE ID dependent service, here illustrated as LI, is on-going in the source RBS/eNB, an LI activation message is sent from the identity mediator node to the target RBS/eNB to activate the LI service in the target RBS/eNB.

Signaling related to control of the UE ID dependent service is concluded by a handover completion message sent to the identity mediator node from the target RBS/eNB.

Steps performed in the MME and RBS/eNB have not been separately disclosed in the above discussion on S1 handover, but are of course also a part of the disclosed solution.

UE Detachment

When the UE detaches from the network, the record stored in the identity mediator node is no longer valid and should be removed. The UE ID dependent service, if active in an RBS, should also be deactivated. The step of deactivating the UE ID dependent service during detachment is in analogy with the above disclosed deactivation of a UE ID dependent service, but will here be repeated in the context of UE detachment.

At a starting point for the UE detachment, the identity mediator node is in control of a UE ID dependent service in a wireless network and includes a stored record corresponding to the above disclosed Record 1. The identity mediator node receives, in a UE ID report from the MME, a permanent UE identity and an order to detach from the wireless network. The identity mediator node retrieves the temporary UE ID and serving RBS identity from the stored record and sends a request to the serving RBS to deactivate the UE ID dependent service for the UE, wherein the request includes the temporary UE ID. Following the request for deactivation sent to the serving RBS, the identity mediator node removes the stored record associated to the permanent UE ID.

The identity mediator node updates its UE ID mapping database by clearing the stored record for the UE with the given permanent UE ID, e.g. the IMSI, as disclosed below in Record 8.

Record 8

| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
| --- | --- | --- | --- | --- | --- |
| <IMSI> | ~~<eNB ID>~~ | ~~<MME S1AP UE ID>~~ | | | N |

Figure 6D:
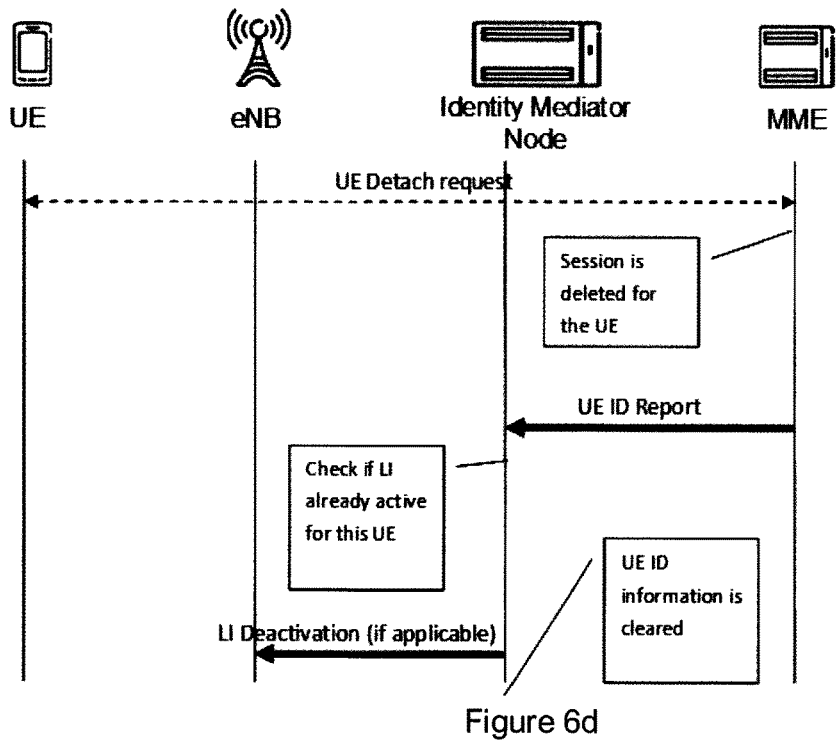

FIG. 6d illustrates signaling between the UE, network nodes and the identity mediator node to control lawful interception, LI, upon UE detachment from the wireless network. Following a UE detach request exchanged between the UE and a receiving MME, the MME sends a UE ID report message to the identity mediator node, the UE ID report message including at least the permanent UE ID assigned to the UE and information on the cause of the message. In an example, the UE ID report message includes the IMSI and the cause detachment.

If a UE ID dependent service, here illustrated as LI, is on-going in the serving RBS/eNB, an LI deactivation message is sent from the identity mediator node to the serving RBS/eNB to deactivate the LI service. The LI deactivation concludes the signaling performed in the identity mediator node for the purpose of UE detachment. The stored record representing UE ID information is cleared.

Steps performed in the MME and RBS/eNB have not been separately disclosed in the above discussion on detachment, but are of course also a part of the disclosed solution.

IRAT Handover

In the above the disclosure, the control of the UE ID dependent service is disclosed for an LTE network. Handover cases also involve UE movements to or from a non-LTE network. However, the disclosed solution is applicable to radio access technologies where an RBS/eNB where the UE ID dependent service is performed is ignorant of the permanent UE ID.

Handover to a LTE wireless network from a non-LTE network is performed in analogy with the previously disclosed method for S1 handover.

A record for the UE Identity in the LTE network is created in the identity mediator node. The record corresponding to previously disclosed Record 1.

Handover from an LTE RBS/eNB to a non-LTE RBS is performed as disclosed below. The identity mediator node holds a record storing a permanent UE ID, a temporary UE ID and the global RBS/eNB identity of the serving eNB/RBS. In the following presentation of the IRAT handover, the term source RBS/eNB will be used to denote a serving or current RBS/eNB that the handover is performed from.

When the handover preparation phase is completed, the LI function in the source RBS/eNB sends a handover initiation message to inform the identity mediator node that a UE identified by the temporary identity MME S1AP UE ID is about to handover to a non-LTE RBS. The identity mediator node updates the stored record for the UE to note that handover to a non-LTE RBS is in progress as disclosed below in Record 9.

Record 9

| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
|---|---|---|---|---|---|
| <IMSI> | <source eNB ID> | <source S1AP ID> | N/A <Non-LTE RBS> | | ~~N~~ Y |

When the handover is finished, the source RBS/eNB deactivates the UE ID dependent service, e.g. LI for the UE in question, if it was active, by removing the MME S1AP UE ID from its list of intercepted UEs. The source RBS/eNB sends a handover completion message to inform the identity mediator node that the handover is completed. The UE ID information stored in the record of the identity mediator node is cleared, as disclosed below in Record 10.

Record 10

| Permanent UE ID/ IMSI | Serving or current RBS/eNB | Temporary UE ID/ Current MME S1AP UE ID | Target RBS/eNB | Target temporary UE ID/ MME S1AP UE ID | Handover ongoing |
|---|---|---|---|---|---|
| <IMSI> | ~~<eNB ID>~~ | ~~<MME S1AP UE ID>~~ | | | N |

If handover fails, the source RBS/eNB informs the identity mediator node that removes the handover in progress information from the stored record and reverts to the previously stored record.

Steps performed in the MME and RBS/eNB have not been separately disclosed in the above discussion on IRAT handover, but are of course also a part of the disclosed solution.

Figure 5:
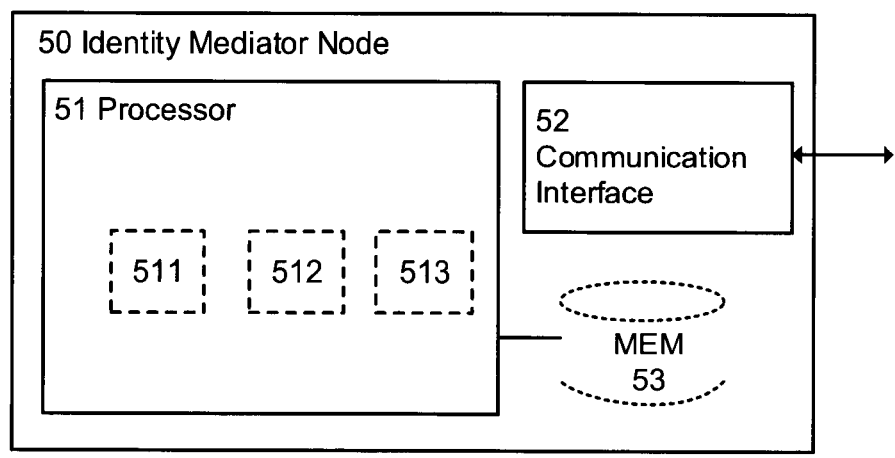
FIG. 5 is block diagram schematically illustrating an identity mediator node embodiment.

FIG. 5 is a block diagram schematically illustrating an embodiment of an identity mediator node for performing the method step embodiments. The identity mediator node 50 comprises a processor 51 or a processing circuitry that may be constituted by any suitable Central Processing Unit, CPU, microcontroller, Digital Signal Processor, DSP, etc. capable of executing computer program code. The computer program may be stored in a memory, MEM 53. The memory 53 can be any combination of a Random Access Memory, RAM, and a Read Only Memory, ROM. The memory 53 may also comprise persistent storage, which, for example, can be any single one or combination of magnetic memory, optical memory, or solid state memory or even remotely mounted memory. The identity mediator node 50 further comprises a communication interface 52 configured communication with other nodes in the network, e.g. by means of a proprietary interface.

According to one aspect the disclosure further relates to a computer-readable storage medium, having stored thereon the above mentioned computer program which when run in an identity mediator node, causes the node to perform the disclosed method embodiments. When the above mentioned computer program is run in the processor of the identity mediator node 50, it causes the node to receive, from a Mobility Management Entity, MME, a UE ID report comprising a permanent UE ID, a temporary UE ID, and a serving RBS identity for an RBS serving the UE, wherein the temporary UE ID represents an identifier for the UE in the serving RBS; to store a record associating the temporary UE ID, the serving RBS identity, and the permanent UE ID; and when an order to activate a UE ID dependent service for a permanent UE ID is detected in the identity mediator node, to retrieve the temporary UE ID and serving RBS identity from the stored record and send a request to the serving RBS to activate the UE ID dependent service for the UE, wherein the request includes the temporary UE ID.

According to one aspect of the disclosure, the memory 53 further comprises a database 531 including stored records associating a temporary UE ID, a serving RBS identity and a permanent UE ID.

According to a further aspect of the disclosure processor 51 further comprises one or several of:
 a receiver module 511 configured to receive a UE ID report comprising a permanent UE ID, a temporary UE ID, and a serving RBS identity for an RBS serving the UE, wherein the temporary UE ID represents an identifier for a UE in the serving RBS;
 an association retrieval module 512 configured to retrieve any of the temporary UE ID, serving RBS identity or permanent UE ID from a record stored in the memory 53, based on the associations stored in the memory; and
 a UE ID dependent service activation module 513 configured to send a request to a serving RBS to activate the UE ID dependent service for the UE.

The receiver module 511, the association retrieval module 512 and the UE ID dependent service activation module are implemented in hardware or in software or in a combination thereof. The modules 151, 152, 153 are according to one aspect implemented as a computer program stored in a memory 53 which run on the processing circuitry 51.

The invention claimed is:

1. A method, performed in an identity mediator node, of controlling a user equipment (UE) identity (ID) dependent service for a UE in a radio base station (RBS) of a wireless network, the method comprising:
 receiving, from a Mobility Management Entity (MME), a UE ID report comprising a permanent UE ID for a particular UE, a serving RBS identity for an RBS serving the particular UE, and a temporary UE ID for the particular UE in relation only to the serving RBS and the MME;
 storing, for the particular UE, a record associating the temporary UE ID, the serving RBS identity, and the permanent UE ID; and,
 upon receiving an order to activate the UE ID dependent service for the permanent UE ID, retrieving the temporary UE ID and the serving RBS identity from the stored record and sending a request to the serving RBS to activate the UE ID dependent service for the particular UE, wherein the request includes the temporary UE ID for the particular UE.

2. The method of claim 1, wherein the UE ID report is received when the UE attaches to the RBS.

3. The method of claim 2, wherein the permanent UE ID is an International Mobile Subscriber Identity (IMSI), Mobile Subscriber ISDN Number (MSISDN), International Mobile Station Equipment Identity (IMEI), or Mobile Equipment Identifier (MEID).

4. The method of claim 1, wherein the serving RBS is an eNB of a Long Term Evolution (LTE) wireless network, and wherein the serving RBS identity comprises a Global eNB ID.

5. The method of claim 4, wherein the temporary UE ID is an MME S1AP UE ID, and wherein the MME S1AP UE ID is created in the MME and communicated to the RBS to provide a common identifier for the UE in the MME and the RBS.

6. The method of claim 1, wherein the UE ID dependent service is lawful interception (LI).

7. The method of claim 1, wherein storing a record associating the temporary UE ID, the RBS identity, and the permanent UE ID, further comprises storing a handover status for the permanent UE ID.

8. The method of claim 1, the method further comprising:
receiving, from the serving RBS, a message comprising a target RBS identity of a target RBS selected for handover of the UE from the serving RBS;
storing the target RBS identity in the stored record; and
in response to receiving a handover completion message from the target RBS, updating the stored record to replace the serving RBS identity with the target RBS identity.

9. The method of claim 8, further comprising:
receiving, from the target RBS, a target temporary UE ID that identifies the particular UE in relation only to the target RBS; and
storing the target temporary UE ID in the stored record.

10. The method of claim 8, further comprising activating the UE ID dependent service in the target RBS.

11. The method of claim 1, the method further comprising:
receiving; from an MIME; a message comprising a target RBS identity that identifies a target RBS selected for handover of the particular UE, a target temporary UE ID that identifies the particular UE in relation only to the target RBS, and a permanent UE ID for the particular UE;
storing information on the target RBS identity and the target temporary UE ID in the stored record; and
in response to receiving a handover completion message from the target RBS, updating the stored record to replace the serving RBS identity with the target RBS identity.

12. The method of claim 11, further comprising activating a UE ID dependent service in the target RBS.

13. The method of claim 1, the method further comprising:
receiving an order to deactivate the UE ID dependent service for the particular UE,
retrieving, from the stored record, the temporary UE ID associated with the particular UE and the serving RBS identity; and
sending a further request to the serving RBS to deactivate the UE ID dependent service for the particular UE; wherein the request includes the temporary UE ID.

14. The method of claim 1, the method further comprising:
receiving, in a further UE ID report from the MME, the permanent UE ID and an order to detach the particular UE from the wireless network;
retrieving the temporary UE ID and serving RBS identity from the stored record;
sending a further request to the serving RBS to deactivate the UE ID dependent service for the particular UE, wherein the further request includes the temporary UE ID; and
clearing the stored record associated to the permanent UE ID.

15. An identity mediator node for controlling a user equipment (UE) identity (ID) dependent service for a UE in a radio base station (RBS) of a wireless network, the identity mediator node comprising a processor, a communication interface and a memory, said memory containing instructions executable by said processor, whereby said identity mediator node is operative to
receive, from a Mobility Management Entity (MME), a UE ID report comprising a permanent UE ID for a particular UE, a serving RBS identity for an RBS serving the particular UE, and a temporary UE ID for the particular UE in relation only to the serving RBS and the MME;
store, for the particular UE, a record associating the temporary UE ID, the serving RBS identity, and the permanent UE ID; and,
upon receiving an order to activate the UE ID dependent service for the permanent UE ID, retrieving the temporary UE ID and the serving RBS identity from the stored record and sending a request to the serving RBS to activate the UE ID dependent service for the particular UE, wherein the request includes the temporary UE ID for the particular UE.

* * * * *